Sept. 9, 1969          W. ROTHMAYR          3,465,452
CRYODESICCATION APPARATUS
Filed Dec. 1, 1967          3 Sheets-Sheet 1
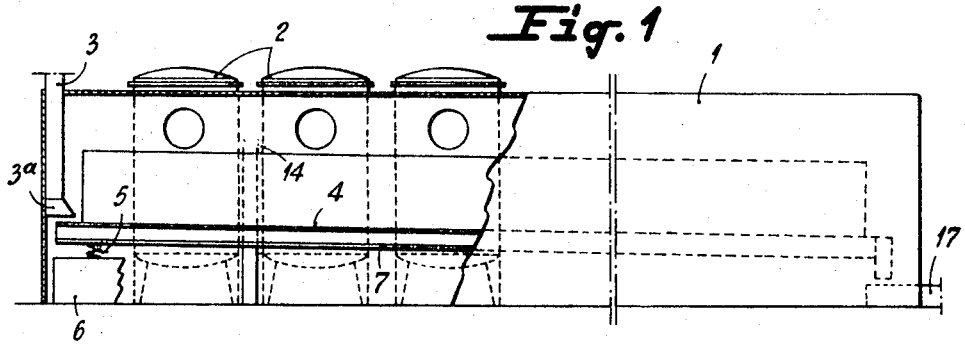
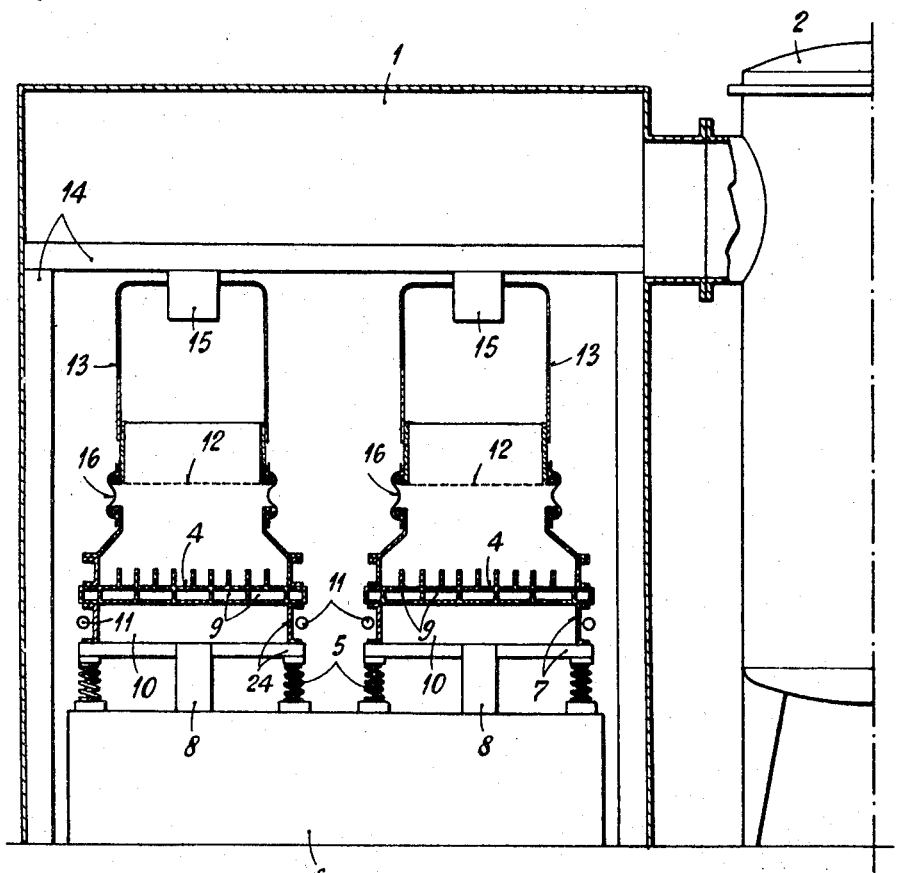

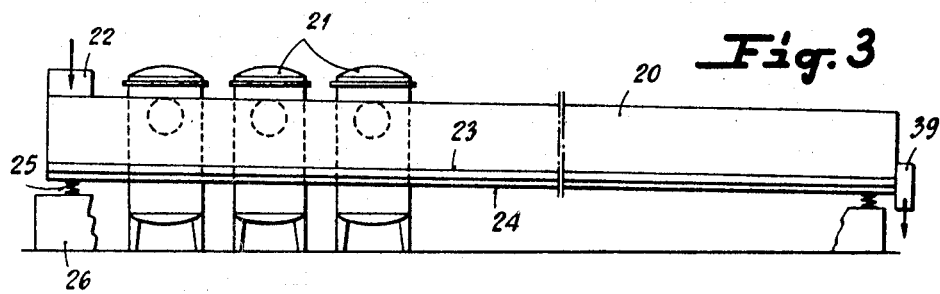
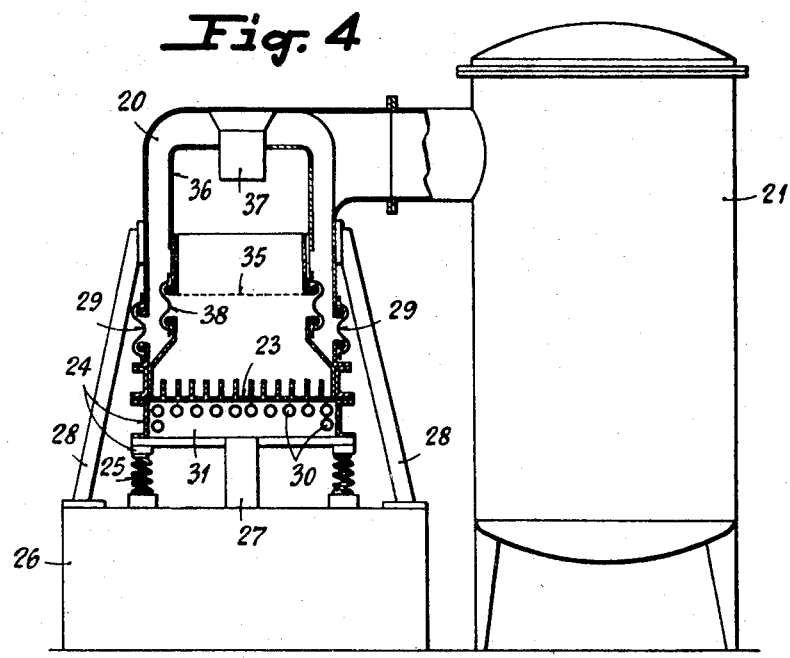

United States Patent Office 3,465,452
Patented Sept. 9, 1969

3,465,452
CRYODESICCATION APPARATUS
Willy Rothmayr, La Tour-de-Peilz, Switzerland, assignor to Afico S.A., Lausanne, Switzerland, a corporation of Switzerland
Filed Dec. 1, 1967, Ser. No. 687,353
Claims priority, application Switzerland, Dec. 23, 1964, 18,532/66
Int. Cl. F26b *15/14, 3/22, 7/00*
U.S. Cl. 34—92                                                    21 Claims

ABSTRACT OF THE DISCLOSURE

Cryodesiccating apparatus has a vibrated support for the material to be dried and at least one filter for catching fine particles removed when the frozen matter in the material is sublimed. Various heating systems can be employed. Another embodiment employs a tunnel-shaped drying chamber.

---

The present invention concerns apparatus for cryodesiccation, and especially such an apparatus functioning continuously and designed to dry various frozen products of reduced moisture content or other products in the form of fragments or particles. It is especially, but not exclusively, useful for the desiccation in the frozen state of liquid products such as milk, fruit juice, liquid extracts of materials such as coffee, tea, etc., various solutions and suspensions, in fact all materials which can be dried in different states.

Apparatus of this type generally comprises an airtight chamber having an inlet and outlet for the product and or support for the product in the chamber, means for heating the product on said support to cause sublimation of the ice, an installation for reducing the pressure in the chamber, means for vibrating the support in order to obtain a displacement of the product from one end of the support to the other and an installation for removing from said chamber the vapours generated by sublimation.

When the dried product comprises fine particles, appreciable loss in experienced during drying. These losses are essentially due to the entrainment of the said particles by the sublimation vapours which are drawn into the condenser.

One of the objects of the invention is to remedy this disadvantage. The apparatus which has this object is especially remarkable by the fact that it comprises, in the zone above the support, at least one filter designed to retain the fine particles of product entrained in the sublimation vapours.

According to the invention, the cryodesiccation apparatus comprises a vacuum chamber, at least one heating device for heating frozen material in the chamber to sublime volatile solids contained in the material, at least one vapour outlet for removing sublimed vapours from the chamber and at least one filter within the chamber arranged to retain fine particles removed from the frozen material.

Preferably, said filter is, relative to the support, fixed independently.

In a particular embodiment of the invention, the cryodesiccation chamber is reduced to the form of a tunnel extending above the support.

This arrangement has the particular advantage that the heating means for the product on the tray may be outside the vacuum chamber. They are consequently accessible during operation of the apparatus and the choice of these heating means can be extended to heat generators the functioning of which requires the use of a fuel mixed with air, for example combustible gases or liquids.

The accompanying drawings show schematically, by way of example only, several forms of execution of the apparatus according to the invention.

FIG. 1 is an elevation in partial longitudinal section of a first form of execution of the invention.

FIG. 2 is a transverse section of the embodiment shown in FIG. 1, on an enlarged scale.

FIG. 3 shows a second embodiment of the invention, in longitudinal elevation.

FIG. 4 shows, on a larger scale, a transverse section of the apparatus shown in FIG. 3.

Figure 5:
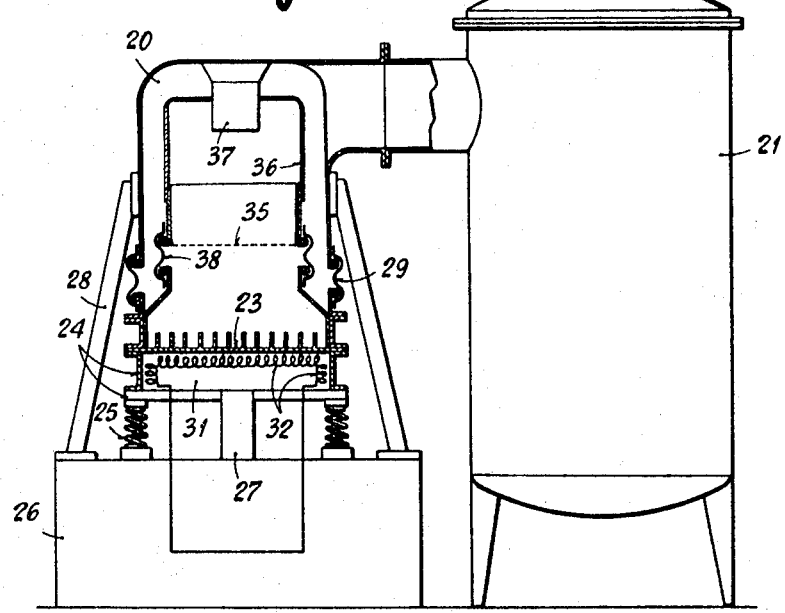
FIG. 5 and FIG. 6 are, on the same scale, sections of apparatus which are variants of those shown in FIG. 3 and FIG. 4.

As shown in FIGS. 1 and 2, the apparatus comprises a cryodesiccation chamber 1 connected to a battery of condensers 2. This chamber is also in contact via the condensers with a pumping installation (not shown) capable of maintaining the interior of the enclosure formed by the walls of the chamber at a reduced pressure of the order of 0.1 mm. of mercury, and a refrigerating installation (also not shown) designed to maintain, especially in said condensers, a temperature lower than the final solidification temperature of a liquid to be removed, a temperature between $-10$ and $-60°$ C. for example.

Chamber 1 is connected to two drying lines placed side by side. It has at one end at least one air lock 3 prolonged by a duct 3a opening on to the adjacent portion of the end of desiccation tray 4. The bottom of duct 3a is preferably provided with a device for distributing the dry product, previously frozen and divided, on the end part of said tray 4.

The latter is mounted on a mounting 7 which rests, by means of elastic members 5, on a rigid stand 6. The mounting 7 is subjected, by means of vibrator device 8 of known construction, to vibrations of a relatively high frequency but small amplitude which cause a slow movement of the product from one end of the cryodesiccation tray to the other while constantly altering the orientation of the particles because of the levelling of the latter. The rate of displacement of the product is regulated by the requirement that, when the particles reach the end of the tray 4, the drying of the product is practically complete.

The rapid sublimation of the frozen liquid implies a progressive heating of the product on the tray 4. To this effect, the latter is ribbed in order to form longitudinal passages 9 which cover the major part of the useful surface of the tray, ribs in which is circulated heating fluid such as steam, mineral oil etc. In another form of execution (not shown) of the apparatus, heating is assured by an electric device integral with or separated from the tray, for example by an infra-red heater across part of the latter. As shown in the drawing, the mounting 7 comprises a chamber 10 in which can be mounted said heating means.

As the apparatus is operated at relatively low temperatures, the heating of the tray leads to temperature differences beween the latter and its mounting 7. The differential expansion of these two elements causes the development of considerable mechanical stress, sufficient to cause rupture of one or other of said elements. In order to avoid this difficulty the mounting 7 has, according to the invention, a suitable heating means which allows it to be maintained at a temperature similar to that of the tray which it supports. According to the illusrated embodiment, the heating means is constituted by tubes 11 in which are circulated the same heating fluid as that which passes through passages 9. Preferably, at least one part of the mounting is thermally isolated and the heating of the different elements can be assured equally well from the exterior (FIG. 2) as from the inside of chamber 10.

In order to avoid loss of a portion of the product, especially the fine particles which are carried to the condensers by the sublimed vapours, the apparatus of the invention has at least one filter disposed in the zone above the plate 4.

According to the form of execution shown in FIG. 2 of the drawing, the filter consists of a sieve 12 (flat or zig-zag), which can be formed as a single or divided piece along the length of several elements mounted end to end. Preferably this sieve is permanently fixed in a rigid chassis 13 in the form of an arch and of which the upper part has the openings necessary to evacuate towards the condensers 2 the filtered sublimation vapours.

According to the invention, the chassis and sieve are not integral with the tray and its support, in order to limit the vibrating mass. In the embodiment shown in the drawing, the chassis 13 is suspended, by means of devices 15, from a rigid structure 14 integral with the walls of the chamber 1. These devices, of a construction known in the mechanical art, electromagnetic or pneumatic for example, are designed to vibrate the above described chassis at a suitable frequency, the shaking being sufficient to free the sieve 12 of particles held on its surface.

Furthermore, the chassis 13 is joined to the tray-mounting assembly 4–7 by a flexible seal 16 adapted to guarantee, with all the latitude imposed by the relative movements of the elements connected to it, an impervious sealing of the chamber between the tray and the filter element.

On reaching the end of the tray 4, the lyophilised product falls through an air-lock 17 where it can be collected directly or transported to a conditioning installation.

In the embodiment described below, the apparatus has a cryodesiccation chamber of large volume in which the entire drying line is housed. In the embodiments of the apparatus shown in FIGS. 3 to 6 of the drawings, the chamber is in the form of a tunnel which, preferably, is supported by an assembly composed of the mounting and the desiccation tray and which extends above these elements.

As shown in FIGS. 3 and 4, the apparatus comprises a cryodesiccation chamber 20 of smaller volume connected to a battery of condensers 21. This chamber is, in conventional manner, in communication through the condensers with a pumping installation (not shown) capable of maintaining the interior of the enclosure formed by the walls at a reduced pressure of the order of 0.1 mm. of mercury, and a refrigeration installation (not shown) designed to regulate, particularly in the condensers, a temperature lower than the final solidification temperature of the liquid to be removed, a temperature between $-10$ to $-60°$ C. for example.

Chamber 20 comprises at one of its ends, an air-lock 22 through which the previously frozen and divided product is introduced into the apparatus. Preferably, said air-lock leads to a device for regulating dispersing a predetermined quantity of product at the end of the cryodesiccation tray 23.

The tray 23 is mounted on a mounting 24 which rests, by means of intermediate elastic members 25, on a rigid stand 26. The mounting 24 is vibrated, by means of an electromagnetic or pneumatic device 27 known in the mechanical art, at a relatively high frequency and low amplitude to produce the effects described above.

The wall of the tunnel which constitutes the cryodesiccation chamber is divided into two superposed parts. The upper part, having the form of an arch, is not integral with the lower part fixed to the tray-mounting assembly 23–24. Thus it is not vibrated with this assembly and it is mounted independently on a rigid structure 28, held rigid by stand 26, for example. The two parts of said cryodesiccation chamber are joined by a flexible seal 29 to assure, with all the displacements caused by the relative movement of the parts, an impervious seal for said chamber. One of the advantages of the arrangement described with respect to FIGS. 3 to 6 is that the first-described heating means is positioned outside the vacuum chamber and is consequently accessible during the functioning of the apparatus. In the embodiment shown in FIG. 4, the heating of the product resting on the tray 23 is assured by the circulation of heating fluid such as steam, mineral oil etc. in the longitudinal tubes 30. The latter are arranged in a chamber 31 which has the mounting 24 which, preferably, is thermally isolated at least partly with respect to the chamber 20. Otherwise, as described above, it is also heated from the chamber 31 by the means used for heating the tray.

According to the embodiment shown in FIG. 5, the heating of the product is effected by an electrical device, for example using infra-red through or from the tray 23. This device, shown schematically by 32, can be positioned in said chamber 31 or in the tray itself. The support is, for example, heated by devices branching from the circuit for heating the tray or by independent devices.

Figure 6:
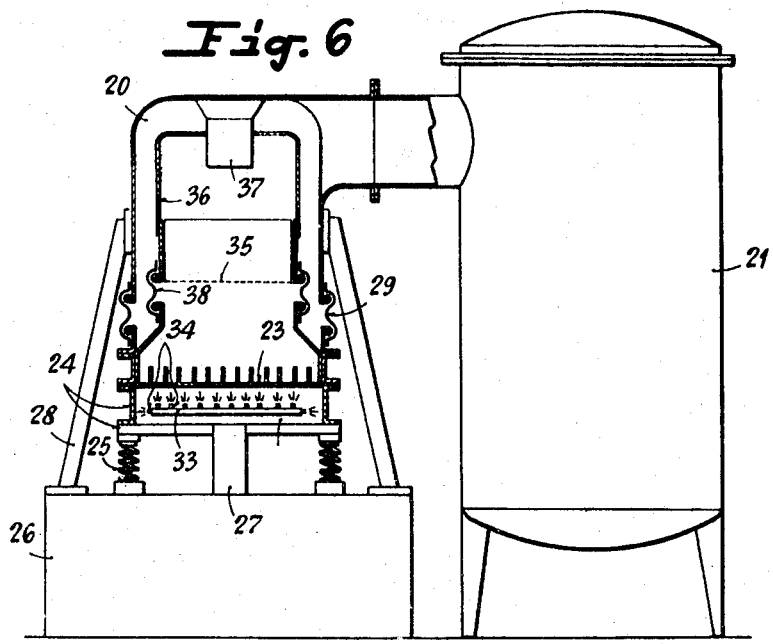

According to the embodiment shown in FIG. 6 the heating means for the product are constituted by an installation comprising a certain number of ducts 33 having burners 34 supplied with combustible liquid or gas. This installation is relatively inexpensive and has the advantage that it is easily and accurately adjustable.

As in the first embodiment, the apparatus shown in FIGS. 3 to 6 has at least one filter in the zone above the tray.

This filter is constituted by a sieve 35 which can be formed in a single piece or divided lengthwise into several elements mounted side by side. According to a preferred embodiment, it is immovably fixed in a rigid chassis 36 having the form of an arch and the upper surface of which is perforated to allow evacuation towards the condensers 21 of the filtered sublimed vapours.

As previously stated, the chassis-filter part is advantageously not integral with the tray-mounting assembly in order to reduce the vibrating mass. As shown, the chassis 36 is suspended by devices 37 from the rigid assembly formed by the wall of chamber 20 and the frame 28. These devices, of construction known in the mechanical art, electro-magnetic or pneumatic for example, are designed to vibrate chassis 36, at a convenient frequency, to shake the sieve sufficiently to free it of the particles held on the surface.

Finally, the closing of the zone between the tray 23 and the sieve 35 is assured by a flexible seal 38 having the same characteristics as the seal 29 described above.

The dried particles which have reached the end of the tray 23 are carried by conventional means into an air-lock 39 which allows the lyophilised product to be removed from the vacuum chamber. The product can then be stored temporarily in bulk or be transferred directly to a conditioning plant.

It should be understood that the invention has been described by way of example only and that various modifications in detail can be made without departing from its scope.

What I claim is:

1. Apparatus for cryodesiccating a frozen product, which comprises an air-tight chamber, a support for said frozen product within the chamber having a first end and a second end, an inlet for said product into the chamber adjacent said first end, an outlet for the product from the chamber, heating means positioned to heat the product on the support and thereby sublime solid material contained therein, evacuating means for reducing the pressure in the chamber, means connected to said support for vibrating said support thereby to displace the product from the first end to the second end, means communicating with the chamber for receiving and condensing sublimed vapour from the chamber during heating, filter means disposed in said chamber to retain fine particles of the product which become entrained in said sublimed vapour, and a vibrator device operably connected with said filter means for vibrating said filter means independently of the means which vibrate said support.

2. Apparatus according to claim 1, in which said filter means is secured to a rigid structure and said rigid structure is suspended above said support.

3. Apparatus according to claim 1, having mechanical driving means connected to said vibratable means for vibrating the latter.

4. Apparatus according to claim 1, having electromagnetic driving means connected to said vibratable means for vibrating the latter.

5. Apparatus according to claim 1, having pneumatic driving means connected to said vibratable means for vibrating the latter.

6. Apparatus according to claim 1, having a flexible seal between said support and said filter means.

7. Apparatus according to claim 1, having a vibratable structure on which is mounted said support, and heating means for said vibrating structure.

8. Apparatus according to claim 7, having common heating means for said support and said vibratable structure.

9. Apparatus according to claim 7, in which the vibratable structure is thermally isolated.

10. Apparatus according to claim 1, having a plurality of units each comprising a support and a filter means within the same chamber.

11. Apparatus for cryodesiccating a frozen product, including an air-tight chamber comprising a support for said frozen product having a first end and a second end, a tunnel-like enclosure positioned above said support, flexible seal means joining said enclosure to said support in air-tight relationship, an inlet for said product into said chamber adjacent said first end of the support, an outlet for the cryodesiccated product from said chamber adjacent said second end of the support, heating means positioned to heat the product on the support and thereby sublime solid material contained therein, evacuating means for reducing the pressure in the chamber, means connected to said support for vibrating said support thereby to displace the product from said first end to said second end, means communicating with said chamber for removing sublimed vapour, filter means disposed in said chamber to retain fine particles of the product which become entrained in said sublimed vapour, and a vibrator device operably connected with said filter means for vibrating said filter means independently of the means which vibrate said support.

12. Apparatus according to claim 11, having a rigid structure independent of said support to which said tunnel-like enclosure is fixed, and wherein said filter element is supported from said enclosure by said vibrator device.

13. Apparatus according to claim 11, in which said support comprises a tray having upper and lower surfaces, ribs extending between said surfaces to provide passages within said support, and a source of heating fluid connected with said passages for circulating heating fluid therein.

14. Apparatus according to claim 11, in which said support comprises a tray having upper and lower surfaces, and means positioned below said lower surface of the tray for heating said tray.

15. Apparatus according to claim 11, in which said support comprises a ribbed tray and said heating means is housed in a chamber below said tray.

16. Apparatus according to claim 15, in which said heating means comprises a plurality of burners connected to a source of combustible fluid.

17. Apparatus according to claim 16, in which said fluid is gaseous or liquid.

18. Apparatus according to claim 11, having a vibratable structure on which said support is mounted and heating means for heating said structure.

19. Apparatus according to claim 18, having common heating means for said support and said vibratable structure.

20. Apparatus according to claim 18, in which said vibratable structure is thermally isolated.

21. Apparatus for cryodesiccating a frozen product, which comprises an air-tight chamber, a support for said frozen product within the chamber having a first end and a second end, an inlet for said product into the chamber adjacent said first end, an outlet for the product from the chamber, mounting means on which said support is received, a stand, elastic members supporting said mounting means on said stand, heating means positioned to heat the product on the support and thereby sublime solid material contained therein, evacuating means for reducing the pressure in the chamber, vibrating means operably connected with said mounting means for vibrating said mounting means and the support received thereon thereby to displace the product from the first end to the second end of said support, means communicating with the chamber for receiving and condensing sublimed vapour from the chamber during heating, filter means disposed in said chamber to retain fine particles of the product which become entrained in said sublimed vapour, and a vibrator device operably connected with said filter means for vibrating said filter means independently of the means which vibrates said support, said filter means being supported from a rigid structure by said vibration device in a position above said support.

References Cited

UNITED STATES PATENTS

| | | | |
|---|---|---|---|
| 1,151,417 | 8/1915 | Stokes | 34—92 |
| 2,086,699 | 7/1937 | Dalin | 34—92 |
| 3,247,600 | 4/1966 | Togashi | 34—92 |
| 3,264,747 | 8/1966 | Fuentevilla | 34—5 |
| 3,364,591 | 1/1968 | Eilenberg | 34—92 |

WILLIAM J. WYE, Primary Examiner

U.S. Cl. X.R.

34—5

PO-1050
(5/69)

UNITED STATES PATENT OFFICE
CERTIFICATE OF CORRECTION

Patent No. 3,465,522                    Dated  September 9, 1969

Inventor(s)  Willy Rothmayr

It is certified that error appears in the above-identified patent and that said Letters Patent are hereby corrected as shown below:

Column 1, line 7 "1964" should read -- 1966 --;

Column 1, line 42 "in" should read -- is --;

Column 2, line 67 "illusrated" should read -- illustrated -

SIGNED AND
SEALED
FEB 24 1970

(SEAL)
Attest:

Edward M. Fletcher, Jr.
Attesting Officer

WILLIAM E. SCHUYLER, JR.
Commissioner of Patents